J. B. ETTINGER, DEC'D.
G. A. ETTINGER, ADMINISTRATRIX.
CUTTER HEAD MECHANISM.
APPLICATION FILED JUNE 1, 1921.
1,414,633.
Patented May 2, 1922.
5 SHEETS—SHEET 1.
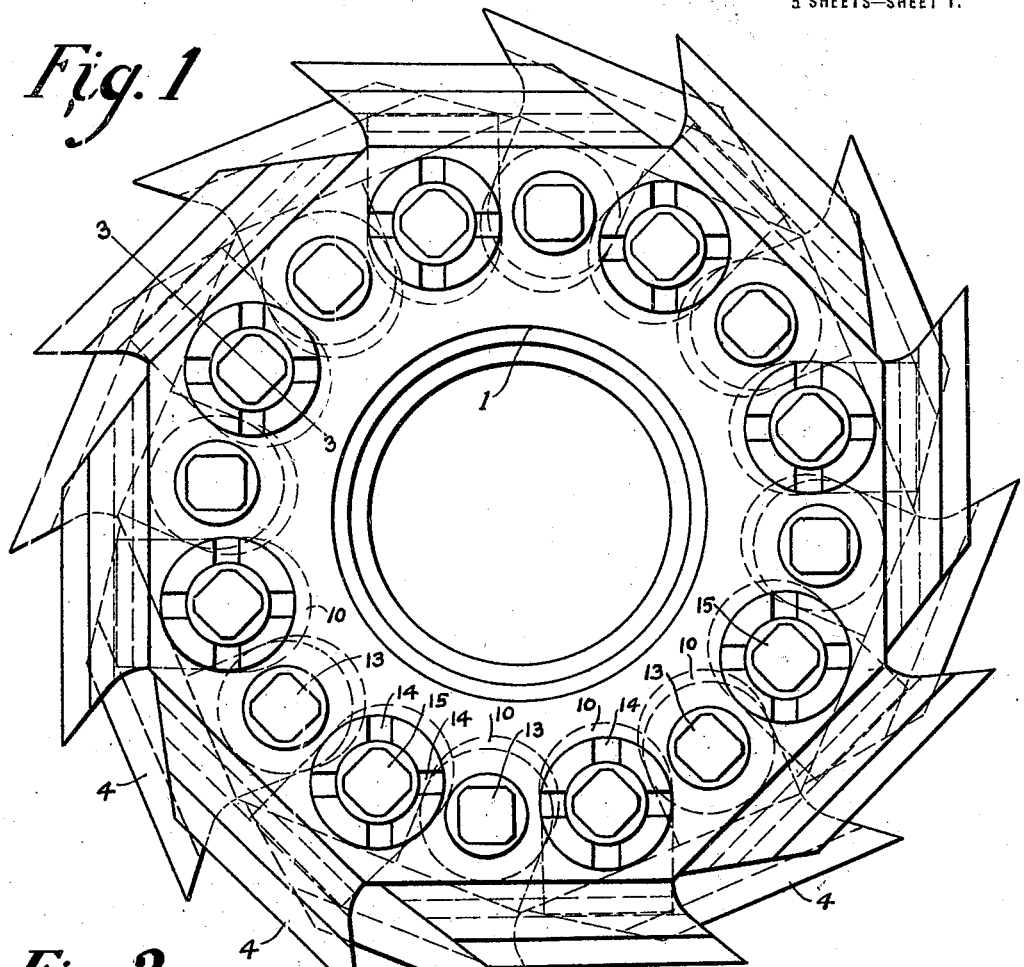
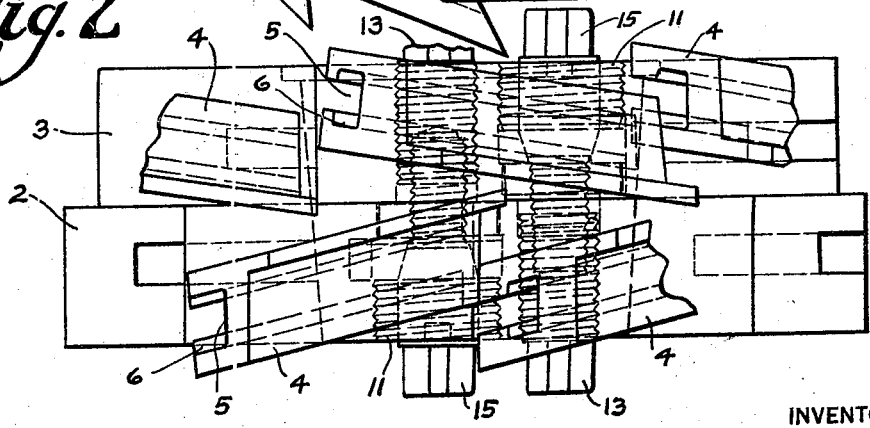
INVENTOR
Grace A. Ettinger Administratrix of the
estate of Joel B. Ettinger Deceased.
BY
Harold E. Stonebraker
ATTORNEY

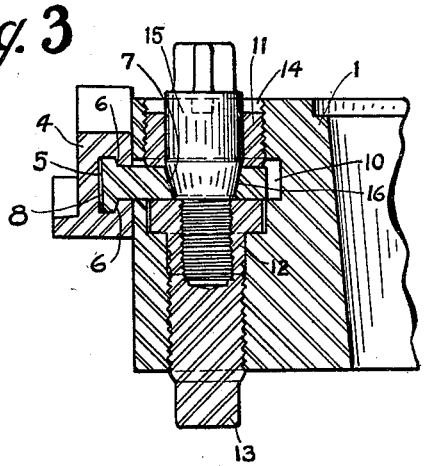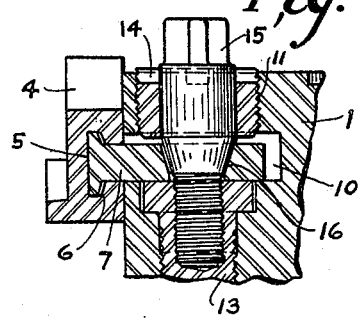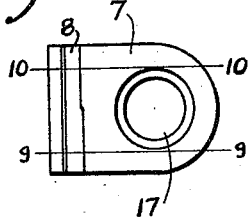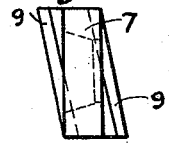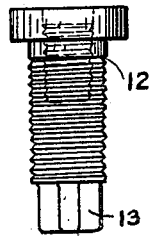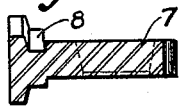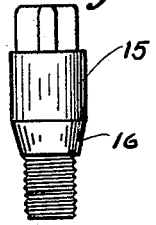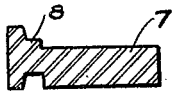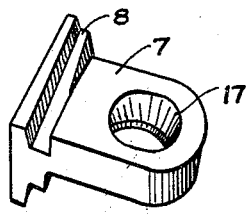

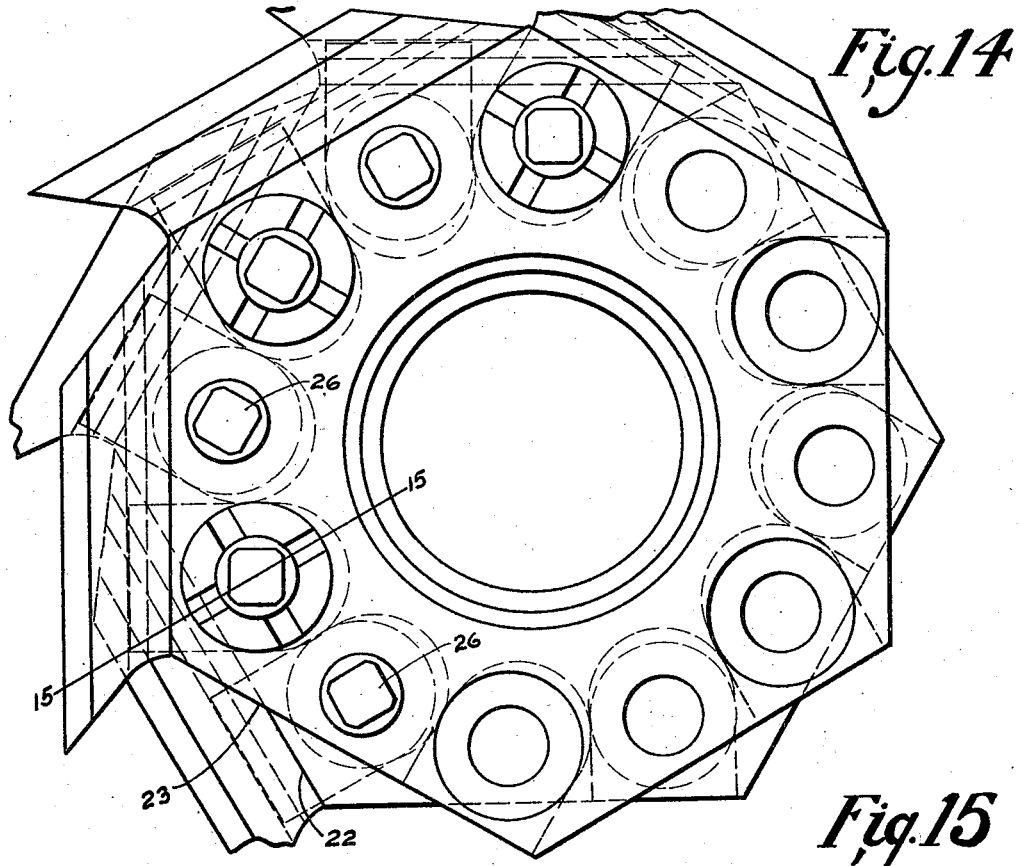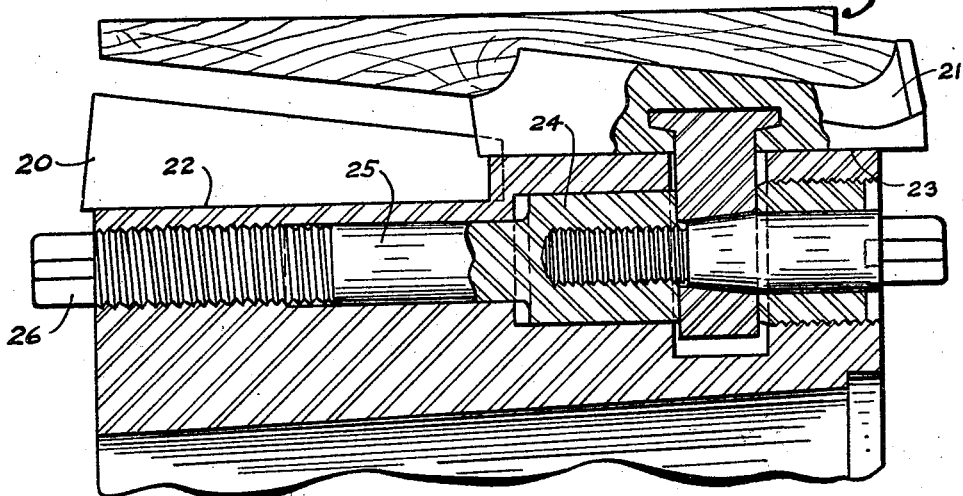

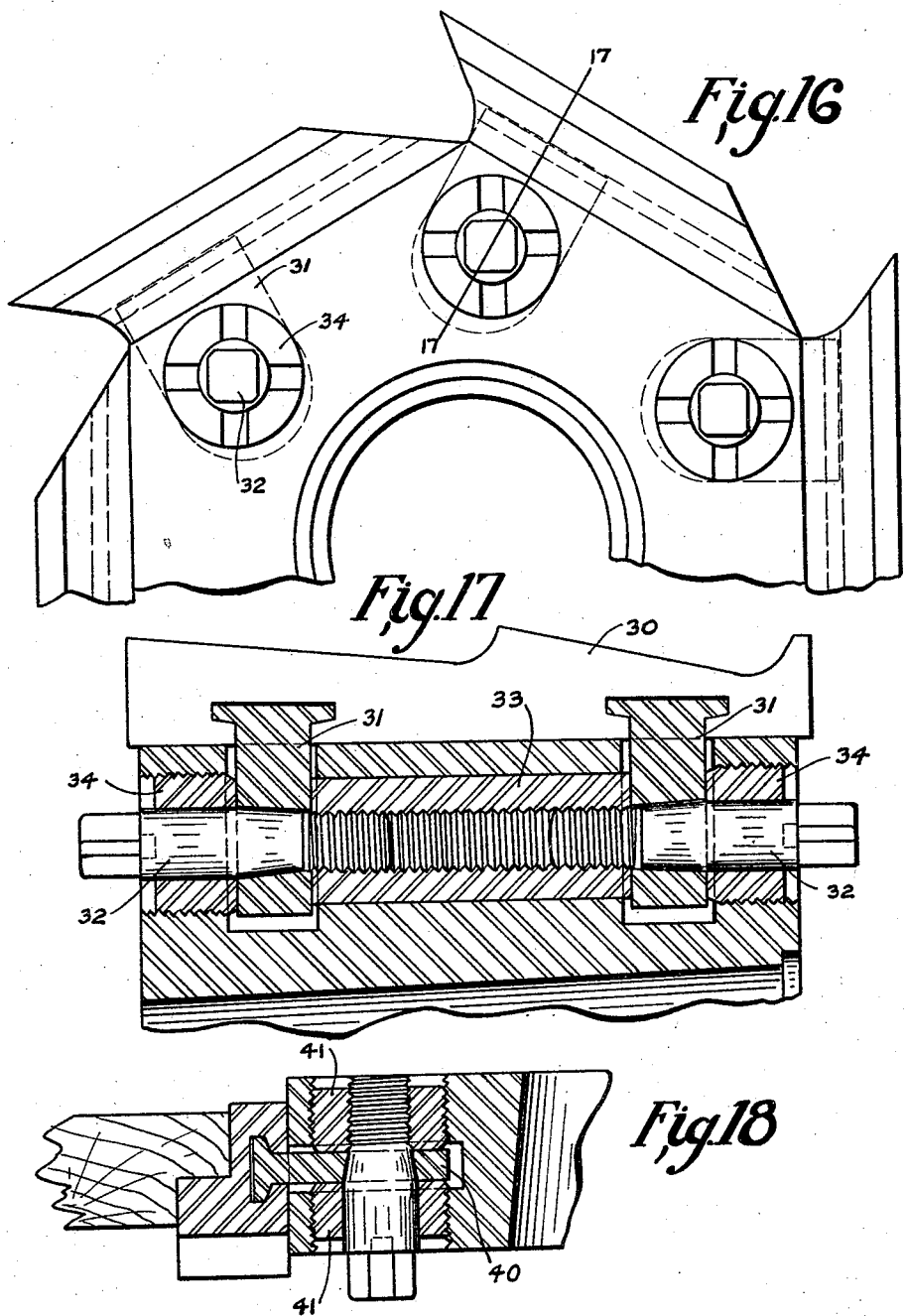

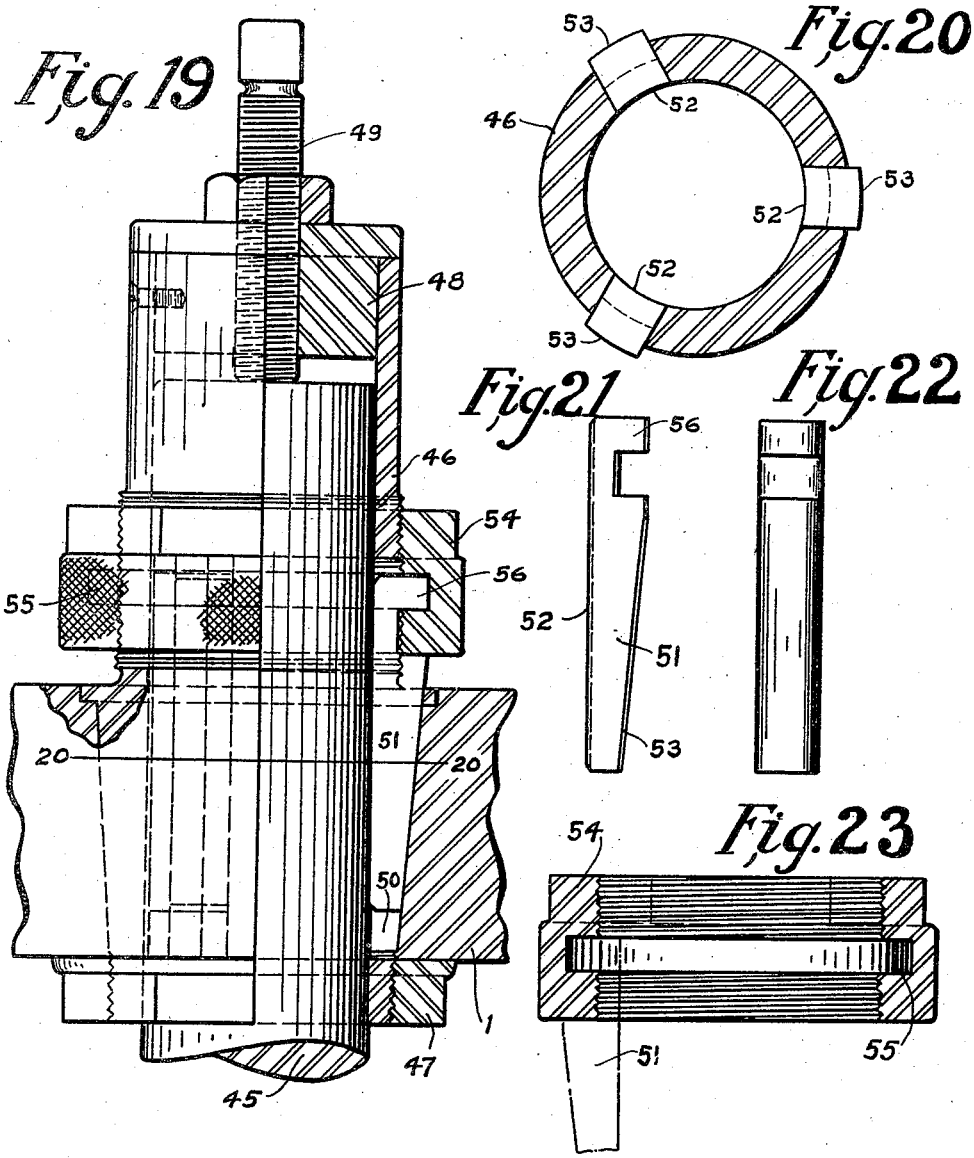

UNITED STATES PATENT OFFICE.

JOEL B. ETTINGER, DECEASED, LATE OF PORTLAND, OREGON, BY GRACE A. ETTINGER, ADMINISTRATRIX, OF PORTLAND, OREGON.

CUTTER-HEAD MECHANISM.

1,414,633.  Specification of Letters Patent.  Patented May 2, 1922.

Application filed June 1, 1921. Serial No. 474,191.

*To all whom it may concern:*

Be it known that JOEL B. ETTINGER, a citizen of the United States of America, late of Portland, in the county of Multnomah and State of Oregon, invented certain new and useful Improvements in Cutter-Head Mechanism, of which the following is a specification.

My invention relates to cutter-head mechanisms, being applicable more particularly to the types of cutter-heads employed in woodworking, as for constructing moldings, grooving, and the like, and it has for one of its principal objects to afford a practical, efficient and readily operated arrangement of parts for accurately centering and tightly clamping the head on its supporting spindle.

Another purpose of the improvement is to provide mechanism for clamping a tool on a cutter-head at an angle to the plane of travel of the head, and permitting adjustment of the tool both lengthwise of itself and at right angles to said plane of travel.

A further object of the invention lies in the provision of simple mechanism for clamping a tool, whereby the tool is adjustably held by a detachable clamping member which is engaged by retaining means carried by the head and is adjustable laterally by means of positioning devices within the head.

Still other purposes and advantages of the invention will appear from the following detailed description, in conjunction with the accompanying drawing, the novel features being pointed out in the claims at the end of the description.

In the drawings:

Figure 1 is a plan view of a cutter-head, showing applied thereto a preferred form of the invention.

Figure 2 is a side elevation of the same.

Figure 3 is a sectional view on line 3—3 of Figure 1, showing the position of the parts when the tool is clamped.

Figure 4 is a similar view, showing the position of the parts when loosened to permit adjustment of the tool.

Figure 5 is a view in elevation of a portion of the cutter-head, showing the clamping member with the tool omitted.

Figure 6 is a perspective view of the clamping member.

Figure 7 is a side elevation of the clamping member.

Figure 8 is a bottom plan view of the clamping member.

Figure 9 is a sectional view on the line 9—9 of Figure 7.

Figure 10 is a sectional view on the line 10—10 of Figure 7.

Figure 11 is a side elevation of one of the positioning sleeves.

Figure 12 is a side elevation of the other positioning sleeve.

Figure 13 is a side elevation of the locking bolt.

Figure 14 is a plan view, illustrating the application of the invention to a slightly different form of cutter-head.

Figure 15 is a sectional view on line 15—15 of Figure 14.

Figure 16 is a partial plan view, illustrating the invention as applied to another form of tool and cutter-head.

Figure 17 is a sectional view on line 17—17 of Figure 16.

Figure 18 is a sectional view of still another modification of cutter-head and tool, with the invention adapted thereto.

Figure 19 is a vertical sectional view, taken centrally through the cutter-head and its supporting spindle, with parts appearing in elevation.

Figure 20 is a horizontal sectional view on the line 20—20 of Figure 19.

Figure 21 is a side elevation of one of the clamping keys.

Figure 22 is a front elevation of the same, and

Figure 23 is a detail sectional view of the actuator for the clamping keys.

This invention is applicable to various types of cutter-heads for different purposes, and in disclosing it in this application as adapted to woodworking cutter-heads, I have no intention of limiting the field of the invention, but it is to be understood that this disclosure is intended merely to show several practical examples of the many various possible adaptations.

Referring to the construction illustrated in Figures 1 to 13 inclusive, 1 designates the cutter-head as a whole, provided with alternately arranged flat surfaces 2 and 3 upon which the tools 4 are mounted, this particular form of cutter-head being adapted for sixteen tools. It will be observed from Figures 2, 3, and 4 that each tool is arranged at an angle to the plane in which the head travels or rotates, and this disposition of the tools provides maximum clearance for each tool, gives a clean and efficient cutting operation, and makes it possible for each tool to be ground and utilized until but a very small portion remains, thus resulting in a factor of considerable economy. Furthermore, the disposition of the tools at an angle as just described, and the means by which they are held in place, lend toward readily adjusting a tool either lengthwise of itself or laterally of the head, and also quickly removing or clamping it in place. I will now describe the parts by which each tool is held in position.

Referring to Figures 2 to 13, the tool 4 is provided on its inner face with a recess 5, having undercut portions with inclined surfaces 6 for cooperation with the tool clamping member. The recess 5 extends preferably from one end of the tool to the other, permitting a relative sliding motion thereof on the clamping member, whereby the tool is adjustable lengthwise of itself.

The tool clamping member includes a body portion 7 and a tool engaging portion 8 arranged at an angle to the body portion, so as to enable positioning and retaining the body portion parallel to the top and bottom surfaces of the head while maintaining the tool at an angle thereto, or to the plane of travel of the head. The tool engaging portion embodies lateral flanges or lips which interlock with the undercut portions of the recess 5 in the tool, the inner surfaces of said lips being inclined as shown at 9, for engagement with the corresponding surfaces 6 of the tool, whereby when the clamping member is drawn into the head, as will appear presently, it exerts a firm gripping action on the tool.

The body portion of the tool clamping member extends preferably into an opening 10 provided in the head, and is there engaged by retaining means, adjustable in the head, so as to hold the clamping member in engagement with the tool, and also permit adjustment of the clamping member and tool at right angles to the plane of rotation of the head.

The retaining means for the tool clamping member may be constructed in various ways, and as an illustration, I have disclosed one possible form consisting of positioning devices which serve to effect the lateral adjustment and a locking device which cooperates with the tool clamping member and the positioning devices. To accomplish this, I employ an exteriorly threaded sleeve 11, having threaded engagement with an opening in the head, and arranged to engage one side of the tool clamping member. The opposite side of the tool clamping member is engaged by a sleeve 12 which is threaded in a corresponding opening in the head. The sleeve 12 has an extended and squared end 13, projecting beyond the head and by which it can be adjusted, while the sleeve 11 has opposite recesses 14 to receive a key by which it can be adjusted.

The lateral position of the tool clamping member is determined by the positioning sleeves just described, and which are turned so as to move both a corresponding distance in the same direction when it is desired to adjust the tool laterally. The tool clamping member is then locked by a bolt 15, which passes through the sleeve 11 and has threaded engagement with an opening in the sleeve 12. The locking bolt 15 includes a tapered locking portion 16, which engages a tapered opening 17 in the body portion of the tool clamping member, so that as the locking bolt is turned inwardly, its locking portion, by engagement with the tapered opening in the tool clamping member, draws the latter toward the center of the head thereby gripping the tool securely against the outer face of the head as shown in Figure 3. In order to insure an effective locking engagement between the bolt 15 and the tool clamping member, the tapered opening 17 is arranged eccentrically to a slight degree with reference to the center of the locking bolt and its tapered locking portion, thus affording a slight clearance between the outer surfaces of the tapered locking portion and the clamping member, as illustrated in Figures 3 and 4. This insures proper contact and a tight gripping action between the inner surfaces of the locking bolt and the tool clamping member.

To adjust the tool, the locking bolt 15 is loosened, and if lateral adjustment is required, the positioning sleeve 11 is also loosened, as shown in Figure 4, so as to permit the tool clamping member to be moved to the desired position laterally of the head. The positioning sleeves are then turned until they are in contact with the tool clamping member, whereupon the locking bolt is turned to grip the tool clamping member.

In Figures 14 and 15, there is illustrated a cutter-head wider than the one previously described, and designed for carrying molding tools or cutters 20 and 21, arranged on the surfaces 22 and 23 of the head. With a construction of this type, in order to provide for the necessary adjustment of both positioning sleeves, the sleeve 24 is formed as part of an elongated bolt 25, extending to the outer surface of the head and provided with a squared adjusting end 26.

Figures 16 and 17 illustrate a modified arrangement of the invention for adapting it to a wide tool, requiring more than one clamping member to hold it. The tool is designated at 30, and is held in place by the tool clamping members 31, each of which is engaged by a locking bolt 32, these parts cooperating in the same manner as already described. 33 is a positioning sleeve disposed in an opening in the head, and located between and in contact with the tool clamping members 31. The sleeve 33 is interiorly threaded to receive the threaded ends of the bolts 32, which latter pass through the positioning sleeves 34. By loosening the positioning sleeves 34, the tool clamping members 31 can be adjusted laterally to any desired point, it being understood that the inner positioning sleeve 33 serves to maintain a fixed distance between the tool clamping members, and necessarily moves with them when they are adjusted in one direction or the other. The desired lateral adjustment of the tool clamping members and of the tool 30 is then maintained by tightening the sleeves 34.

In applying the invention to a narrow cutter-head, such as employed with tools used in forming lap joints, a construction like that illustrated in Figure 18 would be employed, the clamping member 40 being held in the desired position of lateral adjustment by means of the positioning rings 41.

The cutter-head is mounted on a spindle 45, see Figure 19, by mechanism that enables quickly centering the head, and locking it firmly. To accomplish this, I employ a plurality of independent, removable clamping devices, preferably in the form of keys, arranged between the spindle and the head, and held in proper relationship by positioning means which serves to guide the clamping devices to final clamping position. The clamping keys have movement longitudinally of the supporting spindle, and laterally of the positioning means as they are actuated to clamping position and thus insure the correct centering of the head on the spindle.

These several ends are attained by employing positioning means in the form of a sleeve 46, the lower portion of which extends between the spindle 45 and the head 1. The sleeve 46 carries a nut 47 at its lower end, upon which rests the head 1, while 48 is a cylindrical end piece attached to the upper end of the sleeve, and carrying an adjustable post 49 which engages the upper end of the supporting spindle. The sleeve 46 is provided with a plurality of slots 50 cut entirely through the sleeve, and adapted to receive the clamping devices or keys 51. Each clamping key includes a longitudinally straight surface 52, for engagement with the spindle, and a longitudinally inclined surface 53 for engagement with a correspondingly inclined surface on the head.

Thus, by moving the clamping keys lengthwise into the head, they serve to bring about an accurate centering of the head, as the position of the head on the spindle depends entirely upon the thickness and accuracy of the clamping keys, while the positioning sleeve serves only to maintain the clamping keys in their proper longitudinal relation on the spindle. Various means may be provided for effecting the necessary movement of the clamping keys, and one successful way of accomplishing this is by means of an actuator, in the form of a ring 54, threaded on the positioning sleeve 46, and provided with an interiorly arranged annular recess 55. Each of the clamping keys is provided with a lateral extension or lug 56, which projects into the annular recess 55, so that as the actuator 54 is turned in one direction or the other, it carries with it the several clamping keys. As the latter are moved inwardly of the cutter-head, and longitudinally of the spindle, they are also forced laterally of the positioning sleeves 46, by reason of the straight and inclined surfaces on the spindle and head respectively, and this action is continued until a tight fit is had. This mechanism enables a cutter-head to be mounted on a spindle with great rapidity, while at the same time it insures centering the cutter-head with extreme accuracy in relation to the spindle.

While I have described the invention with reference to certain particular applications, it is to be understood as susceptible of various other modifications without in any sense departing from the underlying principles set forth, and this application is intended to cover any other forms of the improvements that may fairly come within the scope of the following claims.

I claim:

1. The combination with a cutter-head, of a tool, a tool clamping member adjustably engaging the tool, adjustable positioning devices arranged in the head on opposite sides of the tool clamping member, the latter having a transverse tapered opening therein, and a locking bolt passing through one of said positioning devices and having threaded engagement with the other of said positioning devices, the locking bolt having a tapered locking portion engaging the aforesaid tapered opening.

2. The combination with a cutter-head, of a tool having a recess in its inner face, said recess having undercut portions, a tool clamping member including a tool engaging portion cooperating with said recess, flanges on the tool engaging portion cooperating with said undercut portions of the recess, said flanges and undercut portions having cooperating inclined surfaces, the tool clamping member also including a body portion extending into the head and having a tapered transverse opening, and a locking bolt adjustable in the head and having a tapered locking portion engaging said tapered opening, the tool engaging portion being arranged at an angle to the body portion of the tool clamping member, and devices for adjusting the tool clamping member and the tool at right angles to the plane of travel of the head.

3. The combination with a cutter-head, of a tool, a tool clamping member adjustably engaging the tool, adjustable positioning devices for the tool clamping member arranged in the head on opposite sides of and cooperating with the tool clamping member, and a locking member engaging said positioning devices and cooperating with the tool clamping member for retaining the latter in adjusted position.

4. The combination with a cutter-head, of a tool, a tool clamping member including a tool engaging portion arranged at an acute angle to the plane of travel of the head and a body portion arranged at an angle to said tool engaging portion and parallel to the plane of travel of the head, the body portion extending into the head and having a tapered transverse opening, a locking bolt adjustable in the head and having a tapered locking portion engaging said tapered opening, and devices for adjusting the tool clamping member and tool at right angles to the plane of travel of the head.

5. The combination with a cutter-head, of a tool, a tool clamping member comprising a body portion and a tool engaging portion arranged at a slight angle thereto, the tool engaging portion extending at a slight angle to the plane of travel of the head and the body portion extending parallel to the plane of travel of the head, adjustable positioning sleeves located in the head on opposite sides of said body portion of the tool clamping member, the body portion of the tool clamping member having a tapered opening therein, and a locking bolt engaging said positioning sleeves and having a tapered locking portion arranged eccentrically of said tapered opening in the tool clamping member and cooperating therewith to lock the latter.

6. The combination with a cutter-head, of a tool, a tool clamping member adjustably engaging the head and having a tapered opening arranged transversely thereof, positioning sleeves adjustably arranged in the head on opposite sides of the tool clamping member, and a locking bolt engaging said sleeves and having a tapered locking portion arranged eccentrically of said tapered opening and cooperating therewith to lock the tool clamping member.

7. The combination with a cutter-head, of a tool, and a tool clamping member including a tool engaging portion and a body portion disposed at a slight angle to the tool engaging portion, whereby the body portion is arranged parallel to the plane of travel of the head while the tool is arranged at an angle thereto in accordance with the angle of the tool engaging portion, and means for adjustably locking the tool clamping member in different positions laterally of the head.

8. The combination with a cutter-head, of a tool, a tool clamping member including a body portion extending into the head, positioning devices for the tool clamping member adjustable in the head on opposite sides of said body portion, and a locking member adjustably secured to said positioning devices and cooperating with the body portion of the tool clamping member.

In witness whereof, I have hereunto signed my name.

GRACE A. ETTINGER,
*Administratrix of the estate of Joel B. Ettinger, deceased.*